April 9, 1929.  R. A. WEINMAN  1,708,003
WELDING TORCH
Original Filed Feb. 20, 1926

Inventor:
Rudolph A. Weinman,
by
His Attorney.

Patented Apr. 9, 1929.

1,708,003

UNITED STATES PATENT OFFICE.

RUDOLPH A. WEINMAN, OF SCHENECTADY, NEW YORK, ASSIGNOR TO GENERAL ELECTRIC COMPANY, A CORPORATION OF NEW YORK.

WELDING TORCH.

Application filed February 20, 1926, Serial No. 89,811. Renewed August 17, 1928.

My invention relates to electric welding and more particularly to improvements in apparatus wherein an electric arc is maintained between a plurality of electrodes and a gaseous medium is supplied to the arc.

My invention is particularly applicable to the utilization of the heating effect of flames of atomic hydrogen. The utilization of such atomic hydrogen flames is disclosed and claimed broadly in the copending application of Irving Langmuir, Serial No. 729,185, filed July 30, 1924, for heating process and apparatus, which application is assigned to the same assignee as the present application. While my invention is well suited for atomic hydrogen flame welding, many of the features of construction thereof are of general application to the type of welding apparatus wherein an arc is maintained between a plurality of electrodes supported adjacent to the work and is especially applicable to such types of welding apparatus wherein a gaseous medium of any suitable character is provided.

My invention will be better understood from the following description taken in connection with the accompanying drawing and its scope will be pointed out in the appended claims.

Figure 1:
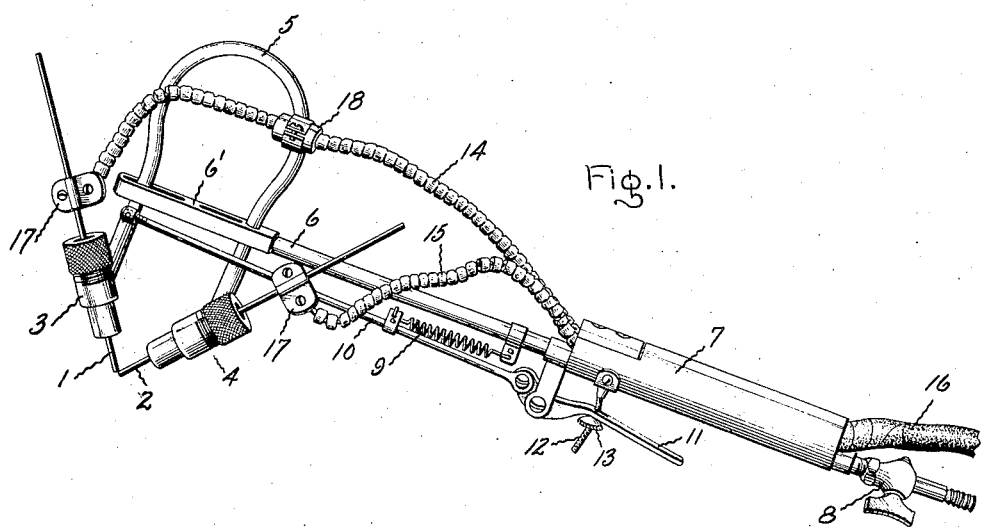
Figure 2:
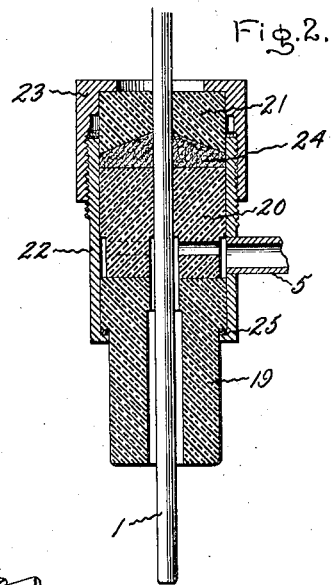
Figure 3:
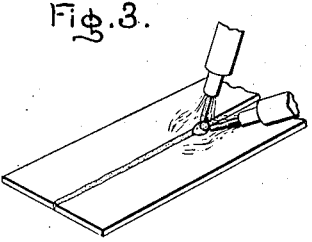

In the drawing, Fig. 1 is a perspective view of a welding torch embodying my invention; Fig. 2 is a sectional view of one of the electrode holders of Fig. 1, and Fig. 3 is a diagram indicating the preferable arrangement of the electrodes with respect to the work when a device comprising two electrodes is used.

In the torch shown in Fig. 1 the electrodes 1 and 2 between which the arc is established are mounted in electrode holders 3 and 4 inclined at any convenient angle to one another and so adjusted that the electrodes can be brought into contact with each other at a point which is exposed to a blast of gas discharged from one or more orifices in the electrode holders. The electrode holders are offset from and mounted on the ends of a U-shaped spring tube 5 which forms a continuation of the tubular support 6 to the other end of which is fastened a handle 7. The free end of this spring tube is carried in a frame 6'. Gas is supplied through a cock 8 to the tube 6, spring tube 5 and holders 3 and 4, from which it is discharged about the electrodes 1 and 2 across the arc formed at their ends. The streams of gas from the electrode holders produce a resultant blast of gas directed toward the work. Where the gas used is hydrogen, the molecular hydrogen is converted at the arc into atomic hydrogen which is blown in a definite direction toward the work. The atomic hydrogen forms a flame which can be brought into contact with the metal to be welded or melted. The recombination of the hydrogen atoms releases heat to fuse the work. The jets of hydrogen discharged from the holders also serve to bathe all the heated parts of the electrodes and the work in an active reducing atmosphere and thus prevent oxidation and the inclusion of nitrogen compound in the weld. Ductile welds may thus be produced.

The electrodes prior to the striking of the arc are kept in contact with each other by a spring 9 acting on the free end of the spring tube 5 through a rod 10. The electrodes are separated by the application of pressure to a lever 11 which is mounted on the supporting tube 6 and which actuates the rod 10 in a direction opposite to that of the spring 9. The angular relation between the holders is thus adjustable. Slow adjustments are made by the screw and nut 12 and 13 mounted on handle 7 and engaging lever 11. The arc may thus be readily controlled by the operator in accordance with his desires.

Current is conducted to the electrodes through conductors 14 and 15 of cable 16 which is connected to a suitable source of supply not shown. These conductors insulated in any suitable way, porcelain beads being shown for this purpose, are attached to the electrodes in any suitable way, clips 17 being shown for this purpose. The conductor 14 is shown supported intermediate its length by insulator 18 mounted on spring tube 5.

The electrodes are shown in Fig. 2 as held in the electrode holders by a plurality of insulators 19, 20 and 21. These insulators are held in place within the casing 22 of the holder by a cap 23. The two lower insulators 19 and 20 are provided with spaces and channels for conducting the gas to be supplied to the arc from the spring tube 5. Packings at 24 and 25 serve to prevent the escape of gas in any but the desired direction and packing 24 also serves to hold by its frictional engagement the electrode in any adjusted position. Lava insulators and asbestos packing have been found to give satisfactory results in my torch. The electrodes may be advanced through the holders in the arrangement shown, by tapping them on their projecting ends. The electrodes may be tungsten electrodes and such electrodes are practically non-consuming in a hydrogen atmosphere so that adjustment need not often be made. It is to be understood that my invention is not limited to any particular means for advancing the electrodes.

In welding, the torch is preferably inclined to the plane of the metal surface which is being welded as diagrammatically shown in Fig. 3 so that the blast of hydrogen from the torch passes over the pool of molten metal formed by the atomic hydrogen flame in a direction opposite to that in which the torch is moved along the line of the weld. In this way the metal at any point along the line of the weld becomes heated and melts very rapidly but cools comparatively slowly so that the dissolved gases have time to escape before the metal freezes.

Both direct current and alternating current, single phase or polyphase, may be used. When polyphase currents are used, the structure of the torch and number of electrodes are changed accordingly. Both the striking voltage and the arc voltage are higher for an arc in hydrogen than for the ordinary welding arc. With direct current, a line voltage of 250 volts has been found to give good results. With alternating current which is more efficient, since the arc can be stabilized by a reactance instead of a resistance, voltages of from 350 to 400 have given satisfactory operation. Voltages as high as these are needed solely to give stability and to enable the arc to be started at any time by separating the electrodes when they are cold. After the arc has been started and the electrode tips have reached their operating temperature, a line voltage of 150 is sufficient to restart the arc as long as the electrodes remain nearly at the operating temperature. A lower line voltage may also be used to start and maintain the arc where the electrodes are first raised to a high temperature by the use of a heating current while the electrodes are held lightly together so as to provide a high contact resistance. In normal operation the drop across the arc in hydrogen is in the neighborhood of from 60 to 100 volts depending upon the separation of the electrodes. With the current values of from 20 to 70 amperes and a separation of the electrodes of from $\frac{1}{16}''$ to $\frac{1}{8}''$ the operating voltage of the arc is from 60 to 80 volts.

To reduce danger to the operator the entire arc circuit is preferably insulated from the ground. When the arc is not operating, the electrodes are in contact due to the action of the spring attached to the control lever so that there is no voltage across the electrodes and the torch may be laid down without danger of flashing. To start the arc the electrodes may be separated by pressing on the lever. Any suitable protective means may be provided to prevent an abnormally high voltage across the electrodes. For example, should the circuit be broken or open at the electrodes, a relay across the arc set for a predetermined high voltage may be arranged to trip the circuit which supplies the arc, or to short circuit the arc.

Other gases or mixtures of gases may be used in place of hydrogen. Mixtures of hydrogen with nitrogen and hydrogen with illuminating gas as well as mixtures of the gases resulting from the decomposition of ammonia and methanol have been used.

While I have illustrated a torch provided with a handle for manual welding, it is apparent that the torch may be mounted in an automatic machine in which relative movement between the flame and the work along the line of the joint to be welded is produced automatically.

What I claim as new and desire to secure by Letters Patent of the United States is:—

1. A welding torch comprising a plurality of arc supporting electrodes inclined to meet at a common point, holders through which the electrodes project, means for supplying a stream of gas from each of said holders to enclose the electrode tips in said gas and to produce a resultant stream of gas across the arc directed toward the work to be welded, and means for adjusting the angular relation between said holders to control the arc.

2. A welding torch comprising a plurality of arc supporting electrodes, a member for supporting the torch, a resilient supporting member for said electrodes mounted on said first member and means for flexing said member to separate the electrodes and control the arc.

3. A welding torch comprising a plurality of arc supporting electrodes inclined at an angle to each other, a U-shaped supporting member for said electrodes, electrode holders carried by and offset from said U-shaped supporting member, means for supplying gas about the projecting portions of the electrodes to produce a resultant stream of gas across the arc directed toward the work to be welded, means for regulating the supply of gas, and means for flexing the U-shaped supporting member to separate the electrodes and control the arc.

4. An electrode holder for supporting an electrode and supplying gas about the electrode comprising a hollow member, an insulator in said member for supporting said electrode provided with openings for discharging gas about the arcing end of the electrode and toward the work, and packings between the electrode and the insulator and the insulator and the supporting member for clamping the electrode and preventing the escape of gas except through the openings provided.

5. A welding torch comprising holders for supporting a plurality of electrodes in inclined relation to one another, means for discharging jets of gas about said electrodes to enclose the electrode tips in said gas and to produce a resultant stream of gas across the tips of said electrodes, a spring tube for supporting one of said holders and for supplying gas to said gas discharging means, and means for flexing said tube to control the relative positions of said electrodes.

6. A welding torch comprising a plurality of electrode holders and a substantially U-shaped spring member for supporting said electrode holders.

In witness whereof, I have hereunto set my hand this 18th day of February, 1926.

RUDOLPH A. WEINMAN.